(12) United States Patent
Noh

(10) Patent No.: US 11,693,269 B2
(45) Date of Patent: Jul. 4, 2023

(54) DISPLAY DEVICE

(71) Applicant: LG DISPLAY CO., LTD., Seoul (KR)

(72) Inventor: Heeseok Noh, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/509,895

(22) Filed: Oct. 25, 2021

(65) Prior Publication Data

US 2022/0163831 A1    May 26, 2022

(30) Foreign Application Priority Data

Nov. 26, 2020 (KR) .......................... 10-2020-0161122

(51) Int. Cl.
*G02F 1/1333* (2006.01)
(52) U.S. Cl.
CPC .... *G02F 1/13332* (2021.01); *G02F 1/133305* (2013.01); *G02F 2202/28* (2013.01)
(58) Field of Classification Search
None
See application file for complete search history.

(56) References Cited

U.S. PATENT DOCUMENTS

| 2016/0054614 | A1* | 2/2016 | Choi | ................ | G02F 1/133608 |
| | | | | | 349/58 |
| 2016/0231774 | A1* | 8/2016 | Lo ......................... G06F 1/1601 |
| 2019/0079604 | A1 | 3/2019 | Kim et al. |
| 2021/0127517 | A1* | 4/2021 | Kim ......................... H05K 5/03 |
| 2021/0320283 | A1* | 10/2021 | Park .................... H01L 51/5246 |

FOREIGN PATENT DOCUMENTS

| KR | 10-2018-0126157 A | 11/2018 |
| KR | 10-2019-0005703 A | 1/2019 |

* cited by examiner

*Primary Examiner* — Richard H Kim
(74) *Attorney, Agent, or Firm* — Birch, Stewart, Kolasch & Birch, LLP

(57) ABSTRACT

A display device includes a display panel having a flat portion and a plurality of curved portions extending from the flat portion in a bent manner. The display device further includes a front member disposed on the display panel, and an adhesive layer disposed between the display panel and the front m ember. The curved portion of the display panel is disposed along an entirety of an edge area of the display panel to minimize a non-display area.

18 Claims, 13 Drawing Sheets

DISPLAY DEVICE

CROSS-REFERENCE TO RELATED APPLICATION

This application claims priority to Korean Patent Application No. 10-2020-0161122 filed on Nov. 26, 2020 in the Korean Intellectual Property Office, the entire disclosure of which is incorporated herein by reference into the present application.

BACKGROUND OF THE INVENTION

Technical Field

The present disclosure relates to a display device, and more particularly, to a structure in which an entire edge area of a display panel is bent to minimize a non-display area surrounding a display area of the display panel.

Description of Related Art

Recently, use and application range of an organic light-emissive display device (OLED) following a liquid crystal display device (LCD) which has been used up to now is gradually expanding.

A display device includes a display panel for implementing an image in which a plurality of light-emissive elements or liquid crystals are disposed on a substrate, and a driving transistor for individually controlling an operation of each light-emissive element or liquid crystal is disposed on the substrate. The plurality of light-emissive elements or liquid crystals of the display panel can display images based on information to be displayed.

Since the liquid crystal display device is not a self-light-emissive device, the LCD needs a light source such as a backlight to emit light as disposed on a rear face of a liquid crystal display panel. The backlight can increase a thickness of the liquid crystal display device, and can cause a limitation in implementing the display device in a variety of designs such as a flexible or circular shape, and can cause brightness and response speed to decrease.

A self-light-emissive display device with a self-light-emissive element can be implemented to be thinner than a display device with a built-in light source can, and does not need a separate light source, and can be implemented as a flexible and bendable display device.

This self-light-emissive display device includes a flexible display panel. The display panel includes a display area AA (active area) and a non-display area NA (non-active area) surrounding a periphery of the display area. In the non-display area, a thin film transistor for driving each of a plurality of pixels disposed in the display area, a line, and a bonding portion with a driving chip are disposed. When the non-display area becomes larger, the display device becomes larger or the display area becomes smaller, thereby possibly causing portability, visibility, or readability to be deteriorated.

Therefore, a display device has been developed in which, in order to minimize the non-display area, left and right areas of the non-display area disposed in an edge area of the display panel are bent to be positioned on a side portion of the display device.

SUMMARY OF THE INVENTION

When a non-display area disposed in an entire edge area of the display panel is curved, a wrinkle can occur in an area where the curved portions meet with each other.

A purpose of the present disclosure is to bend the entire non-display area disposed in the edge area of the display panel toward a side face such that the wrinkle defect may not occur, thereby minimizing the non-display area.

A purpose of the present disclosure is not limited to the purpose as mentioned above, and other purposes that are not mentioned will be clearly understood by those skilled in the art from following descriptions.

A display device according to an embodiment of the present disclosure comprises a display panel including a flat portion and a plurality of curved portions extending from the flat portion in a bent manner; a front member disposed on the display panel; and an adhesive layer disposed between the display panel and the front member.

According to an embodiment of the present disclosure, the plurality of curved portions include a first curved portion disposed at and along at least one of four sides of the display panel, and a second curved portion disposed at one or more of corners between the four sides of the display panel. The adhesive layer has a size smaller than a size of each of the display panel and the front member.

A display device according to another embodiment of the present disclosure includes a display panel including a flat portion and a plurality of curved portions extending from the flat portion in a bent manner; a front member disposed on the display panel; and an adhesive layer disposed between the display panel and the front member.

According to an embodiment of the present disclosure, the plurality of curved portions include a first curved portion disposed at and along at least one of four sides of the display panel, and a second curved portion disposed at one or more of corners between the four sides of the display panel. A side portion of the first curved portion and a side portion of the second curved portion are connected to each other and is integral to each other, and the second curved portion has a concave shape in which a width of the second curved portion increases as the second curved portion extends from a point having a shortest length of the second curved portion to a point connected to the first curved portion.

A display device according to another aspect of the present disclosure comprises a display panel including a flat portion and a plurality of curved portions extending from the flat portion in a bent manner; a front member disposed on the display panel; and an adhesive layer disposed between the display panel and the front member. The plurality of curved portions include a first curved portion formed at and along at least one of four sides of the display panel; and a second curved portion formed at one or more of corners between the four sides of the display panel. A bent length of the first curved portion is larger than a bent length of the second curved portion, and the bent length of the first curved portion is a length from a bottom face of the flat portion to a bottom face of a distal end of the first curved portion, and the bent length of the second curved portion is a length from the bottom face of the flat portion to a bottom face of a distal end of the second curved portion.

Details of other embodiments are included in the detailed description and drawings.

According to one or more embodiments of the present disclosure, the display panel includes the curved portions bent at all side portions, thereby reducing the non-display area as recognized by the user.

Further, according to one or more embodiments of the present disclosure, all side portions of the display panel are bent while changing the shapes of the display panel and the adhesive layer as used in the display device, thereby removing the wrinkle defect which can occur at the corner.

Effects of the present disclosure are not limited to the above-mentioned effects, and other effects as not mentioned will be clearly understood by those skilled in the art from following descriptions.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
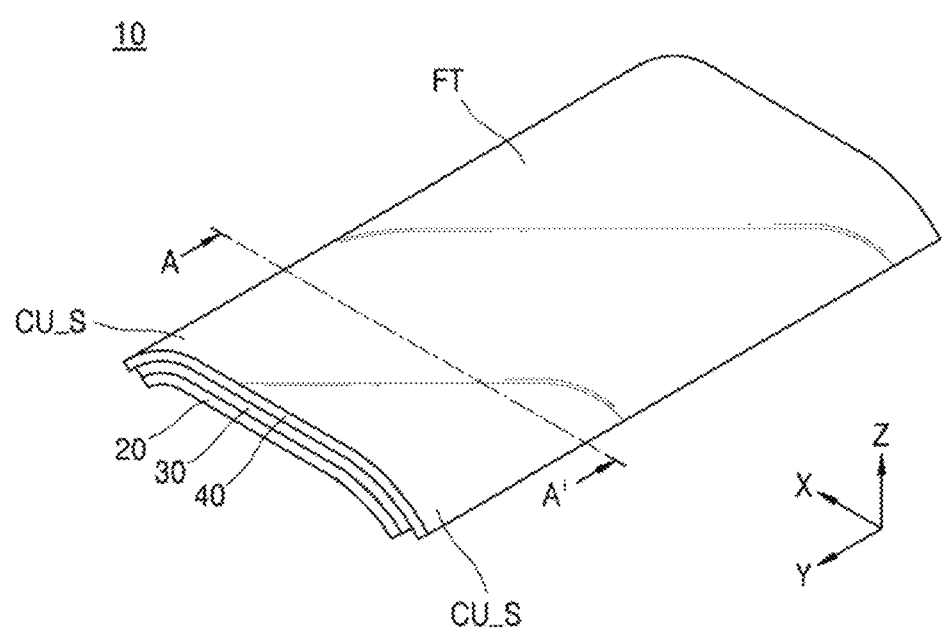
FIG. 1 is a perspective view of a display device according to an embodiment of the present disclosure.

Advantages and features of the present disclosure, and a method of achieving the Advantages and features will become apparent with reference to embodiments described later in detail together with the accompanying drawings. However, the present disclosure is not limited to the embodiments as disclosed below, but can be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a thickness, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements can modify the entire list of elements and may not modify the individual elements of the list. In interpretation of numerical values, an error or tolerance therein can occur even when there is no explicit description thereof.

In addition, it will also be understood that when a first element or layer is referred to as being present "on" a second element or layer, the first element can be disposed directly on the second element or can be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section, and may not define order. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

A display device according to the present disclosure can be applied to an organic light-emissive display device. However, the present disclosure is not limited thereto. The display device according to the present disclosure can be applied to various display devices such as an LED display device or a quantum dot display device.

Hereinafter, a display device according to one or more embodiments of the present disclosure will be described with reference to the accompanying drawings. All the components of each display device according to all embodiments of the present disclosure are operatively coupled and configured.

FIG. 1 is a perspective view of a display device according to an embodiment of the present disclosure.

Figure 2:
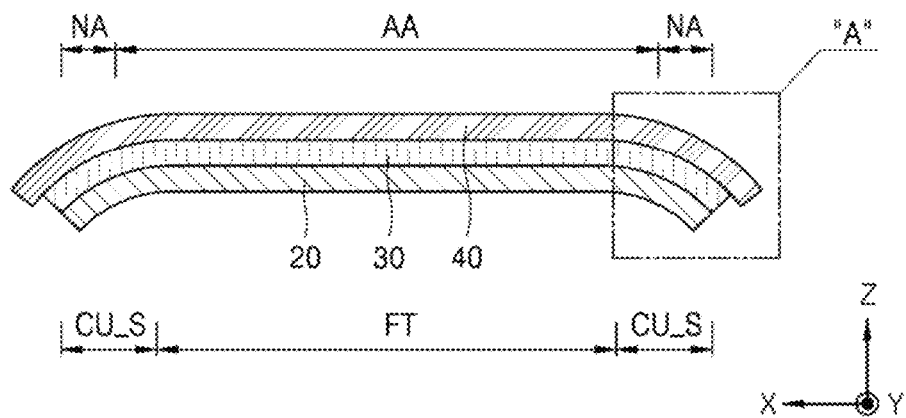
FIG. 2 is a cross-sectional view taken along a line A-A' in FIG. 1.

FIG. 2 is a cross-sectional view taken along a line A-A' in FIG. 1.

Referring to FIGS. 1 and 2, a display device 10 can include a display panel 20, an adhesive layer 30, and a front member 40.

The front member 40 can protect the display panel 20 from external impact. For example, the front member 40 transmits light emitted from the display panel 20 therethrough so that an image displayed on the display panel 20 can be visible to a user. The front member 40 can be formed of a plastic material such as acrylic having impact resistance and light transmittance, or formed of a glass material. The front member 40 can be embodied as a cover glass. However, embodiments of the present disclosure are not limited thereto.

The display panel 20 can include a support substrate, a light-emissive layer, and a polarizing plate.

The support substrate can include a flexible plastic film such as a polyimide film or a polyethylene terephthalate, such that the display panel 20 can be flexibly bent.

The light-emissive layer can be disposed on the support substrate. The light-emissive layer can include a light-emissive element, a driving transistor configured to drive the light-emissive element, and an encapsulation layer. The driving transistor can include an active layer, a gate electrode, a source electrode, and a drain electrode. The driving transistor can be configured in an upper gate electrode manner in which the gate electrode is disposed above the active layer or in a lower gate electrode manner in which the gate electrode is disposed below the active layer. However, embodiments of the present disclosure are not limited thereto.

The light-emissive element can be disposed on the driving transistor. The light-emissive element can include an anode connected to the drain electrode of the driving transistor, a cathode connected to a common electrode, and a light-emissive material disposed between the anode and the cathode. The light-emissive element is easily damaged by oxygen or moisture. Thus, in order to prevent penetration of oxygen or moisture into the light-emissive element, the light-emissive element can be covered with the encapsulation layer.

The encapsulation layer can include at least one inorganic film and at least one organic film. However, embodiments of the present disclosure are not limited thereto.

A touch electrode layer or a polarizing plate can be disposed on the encapsulation layer. The touch electrode layer can include a first touch electrode, a second touch electrode, and an insulating layer. The touch electrode layer can be formed directly on the encapsulation layer. Alternatively, a separate touch panel can be manufactured and attached thereto to form the touch electrode layer.

The polarizing plate can be disposed on the light-emissive layer to prevent visibility deterioration due to reflection of external light.

A stacking order of the components included in the display panel 20 is not limited to the stacking order as described above, but the stacking order can vary.

The display panel 20 can include a display area AA in which an image is displayed and a non-display area NA in which an image is not displayed.

The non-display area NA can be an outer area surrounding a periphery of the display area AA. The non-display area NA can be as a bezel area.

Further, the display panel 20 can include a flat portion FT and a first curved portion CU_S. The flat portion can be disposed in a middle area of the display panel 20. The first curved portion CU_S can extend from the flat portion FT in left and right directions and can be bent at side of the display panel 20.

The display area AA of the display panel 20 can include the flat portion FT and a portion of the first curved portion CU_S. Further, an entirety of the non-display area NA of the display panel 20 can be included in the first curved portion CU_S.

The first curved portion CU_S is bent toward a rear direction (−Z direction) to a front direction (Z axis) in which the display area AA portions. When the user in front of the display area AA views the display panel 10, only an area onto which the non-display area AA is projected in the front direction Z is recognized. Thus, the user can recognize the non-display area NA as an area smaller than an actual size thereof.

Figure 3:
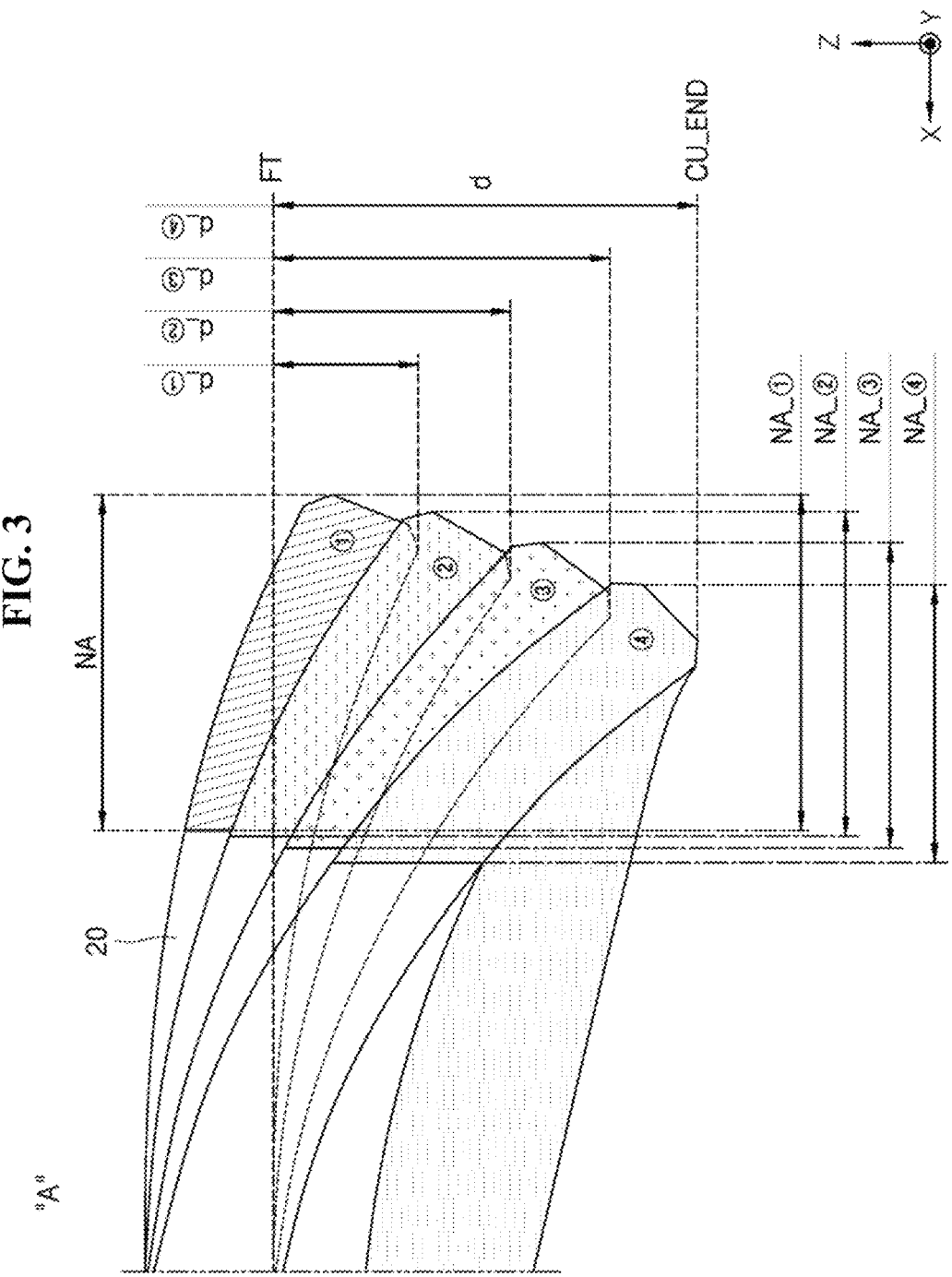
FIG. 3 is a cross-sectional view of a display panel disposed in an "A" area as a first curved portion of the display device of FIG. 2.

FIG. 3 is a cross-sectional view of the display panel disposed in an "A" area as the first curved portion of the display device of FIG. 2. FIG. 3 is a diagram showing a width of the non-display area NA as recognized by the user, based on a bent length d by which the display panel 20 is bent.

Referring to FIG. 3, the bent length d of the first curved portion CU_S of the display panel 20 is defined as a length from a lower portion of the flat portion FT to a lower portion of a distal end CU_END of the first curved portion. When the bent length is 400 μm (d_①), the width of the non-display area NA as recognized by the user in front of the display panel (Z axis) is 1.84 mm (NA_①), which is reduced by 40 μm than that in a flat state. When the bent length is 800 μm (d_②), the width of the non-display area NA as recognized by the user in front of the display panel (Z axis) is 1.77 mm (NA_②), which is reduced by 70 μm than that when the bent length is 400 μm. When the bent length is 1200 μm (d_③), the width of the non-display area NA recognized by the user in front of the display panel (Z axis) is 1.67 mm (NA_③), which is reduced by 100 μm than that when the bent length is 800 μm. When the bent length is 1600 μm (d_④), the width of the non-display area NA recognized by the user in front of the display panel (Z axis) is 1.53 mm (NA_④), which is reduced by 140 μm than that when the bent length is 1200 μm. Thus, as the bent length of the display panel 20 increases, the width of the non-display area NA visible to the user in front of the display panel (Z axis) can decrease.

As illustrated in FIG. 2, in the display panel 20 in which the curved portion CU_S is formed only at both sides in the X-axis or Y-axis, when the bent length of the curved portion CU is increased, the bent length can be freely adjusted because there is no part interfering with the curved portion CU_S only at both sides in the X-axis or Y-axis.

Figure 4:
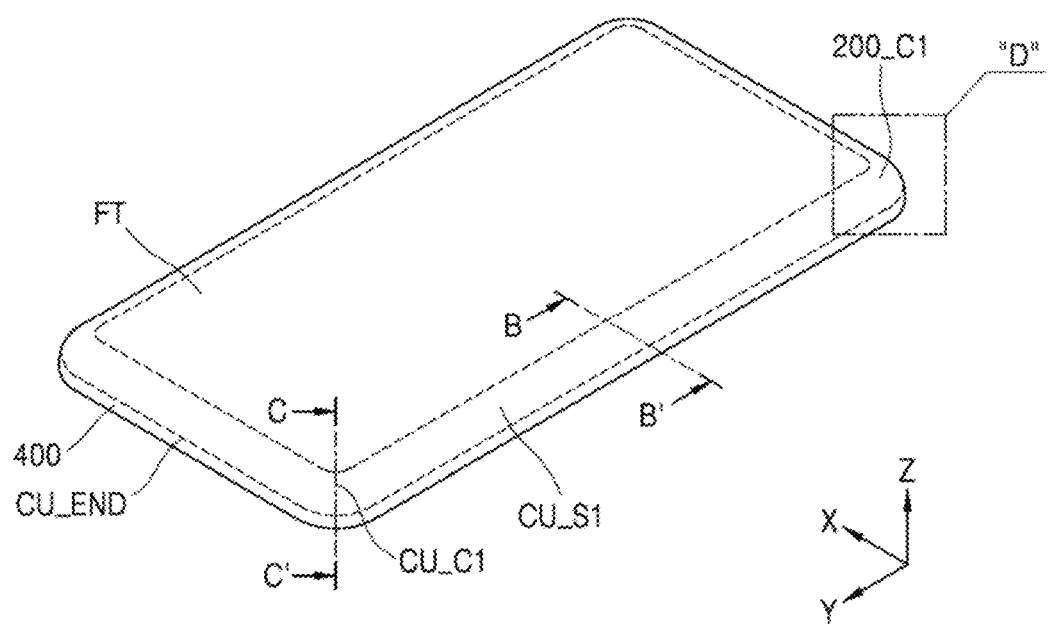
FIG. 4 is a perspective view of a display device according to an embodiment of the present disclosure.

FIG. 4 is a perspective view of a display device including a first curved portion and a second curved portion according to an embodiment of the present disclosure.

Referring to FIG. 4, at all sides of the display device according to an embodiment of the present disclosure, curved portions are formed. Thus, the non-display area recognized by the user is reduced, and the display device has good aesthetic.

The display panel 200 in accordance with an embodiment of the present disclosure has curved portions on all sides including upper (or top), lower (or bottom), left, and right sides disposed along the X and Y axes. Thus, each of areas where two sides meet with each other, that is, a left-top corner, right-top corner, left-bottom corner, and right-bottom corner 200_C1 has a second curved portion CU_C1. Depending on a bent length of at least one or more of the first curved portion CU_S1 and the second curved portion CU_C1, a wrinkle portion and a portion where a load is concentrated can occur. The second curved portion CU_C1 can have a curvature in which the bent length increases or decreases from a point where second curved portion CU_C1 meets the first curved portion CU_S1 toward an edge (or corner).

In this connection, the corner 200_C1 can be defined as an area from an edge (or corner) of the display panel 200 to a side having the first curved portion. The corner 200_C1 can refer to an area corresponding to a 'D' area in FIG. 4 before the bent state.

When the curved portions are formed at all sides, it becomes difficult to freely set bent length due to the interference between adjacent ones of the plurality of first curved portions CU_S1.

Figure 5:
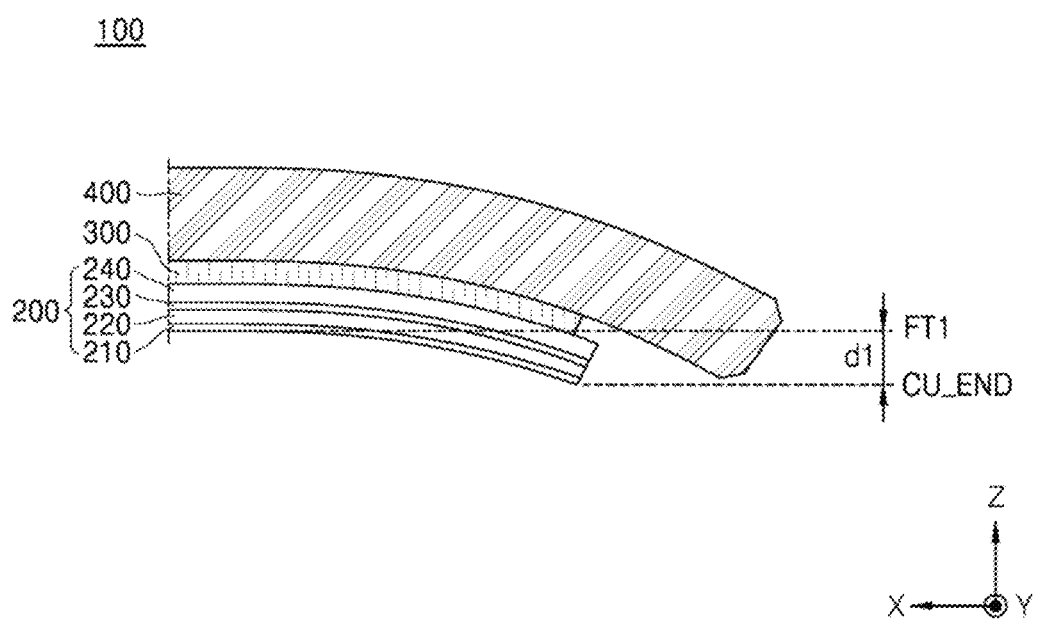
FIG. 5 is a cross-sectional view taken along a line B-B' in FIG. 4.

FIG. 5 is a cross-sectional view taken along a line B-B' in FIG. 4.

FIG. 5 illustrates a cross section of the first curved portion of the display device including the curved portions on all sides of the display device. As described above, the display device 100 can include a display panel 200, an adhesive layer 300, and a front member 400. The display panel 200 can include a substrate protective layer 210, a substrate 220, a light-emissive layer 230, and a polarizing plate 240.

Since unlike the second curved portion CU_C1, the first curved portion CU_S1 of the display panel having curved portions on all sides does not interfere with any portion, the first curved portion CU_S1 has a bent length d1 similar to that of the first curved portion CU_S of the display panel having curved portions only on both sides of FIG. 2. A bent length d1 may be defined as a length from a bottom portion of the flat portion FT1 of the display panel 200 to a bottom portion of a distal end CU_END of the first curved portion.

Figure 6:
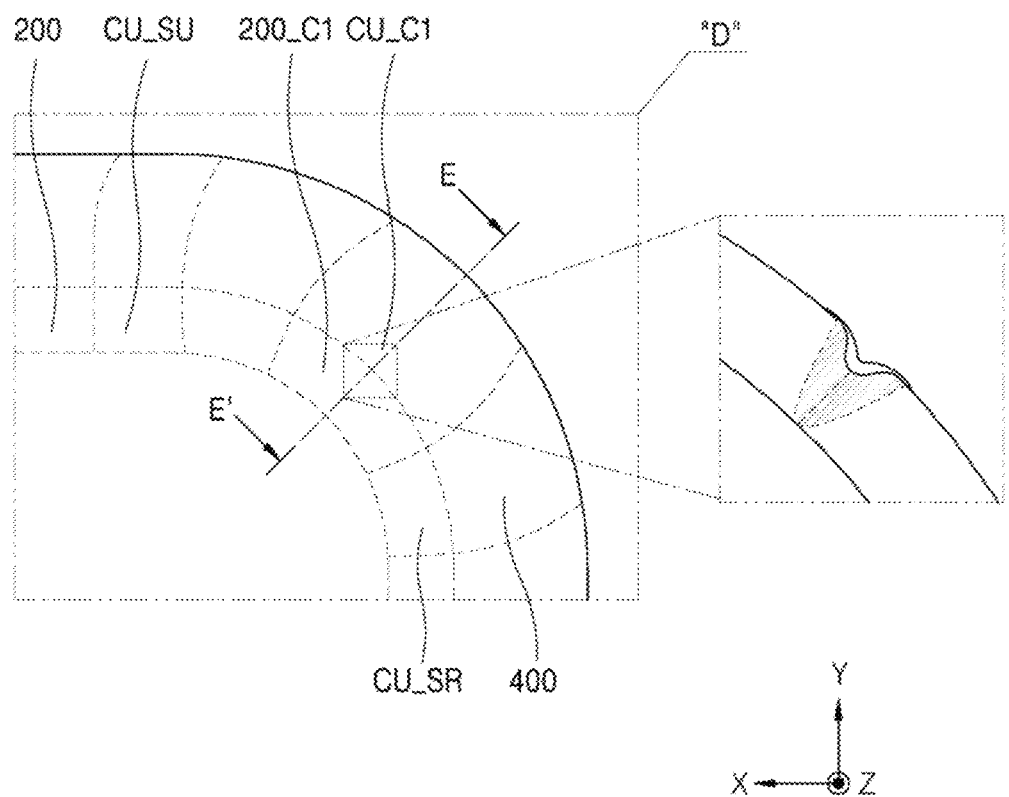
FIG. 6 is an enlarged view of a "D" area in FIG. 4.

FIG. 6 is an enlarged view of the "D" area in FIG. 4.

Particularly, FIG. 6 illustrates a portion where a wrinkle can occur in the second curved portion. Referring to FIG. 6, the front member 400 can be formed of plastic or glass material to have a curved portion without a wrinkle at a corner. However, the display panel 200 disposed under the front member 400 has a structure in which a plurality of components are stacked, and thus when the stacked structure is bent by a bent length above a certain bent length, the wrinkle can occur at the corner 200_C1.

The second curved portion CU_C1 of the display panel 200 can be a bent portion in the corner area of display panel 200. When a first curved portion of an upper portion (or top portion) CU_SU and a first curved portion of a right portion CU_SR are bent, a width portion of a distal end of the first curved portion of the upper portion CU_SU invades the right-top corner 200_C1, and a width portion of a distal end of the first curved portion of the right portion CU_SR also invades the right-top corner 200_C1. Thus, a wrinkle can occur at the right-top corner 200_C1.

In order to remove the wrinkle from the second curved portion CU_C1, an entire second curved portion CU_C1 can be cut off, or only the wrinkle portion can be cut away from the second curved portion CU_C1 and then two cut sides can be connected to each other.

In an embodiment of the present disclosure, a configuration in which the second curved portion CU_C1 is integrally formed with the first curved portion CU_S1 without causing a wrinkle portion in the second curved portion CU_C1 while not cutting away a portion of the second curved portion CU_C1 will be described.

For example, when the bent length of the display panel 200 is below a certain bent length or a size of the adhesive layer is small, the first curved portion and the second curved portion can be integrally formed with each other without cutting away the corner. Thus, following problems can be solved: when the second curved portion CU_C1 of the display panel is partially cut, a boundary line of the cut portion is visually recognized to the user, and thus a display quality deteriorates; further, a signal wire may be reconnected to a cut wire so as to bypass the cut portion, and thus, a wiring design and a manufacturing method can be complicated.

When the second curved portion CU_C1 and the first curved portion CU_S1 are integrally formed with each other, the first curved portion CU_S1 has a linear shape at a front portion (Z-axis) and a round shape at a side portion (X-axis or Y-axis). Further, the second curved portion CU_C1 has a round shape at the front portion (Z-axis) and the side portion (X-axis or Y-axis). Thus, the display device has good aesthetic.

Figure 7:
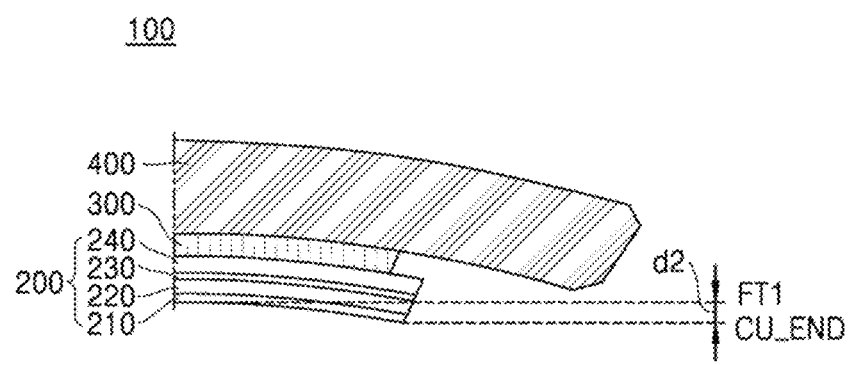
FIG. 7 is a cross-sectional view taken along a line E-E' in FIG. 6.

FIG. 7 is a cross-sectional view along a line E-E' in FIG. 6.

Particularly, FIG. 7 illustrates a bent length of the second curved portion. Referring to FIG. 7, a bent length d2 can be defined as a length from a bottom face of the flat portion FT1 of the display panel 200 to a bottom face of a distal end CU_END of the second curved portion. The bent length d2 is not limited thereto. For example, the bent length d2 can be defined as a length from a top face of the flat portion FT1 of the display panel 200 to a top face of a distal end CU_END of the second curved portion. Alternatively, the bent length d2 can be measured based on a surface of at least one of the components included in the display panel 200 such as the substrate protective layer 210, the substrate 220, the light-emissive layer 230 and the polarizing plate 240.

Figure 8:
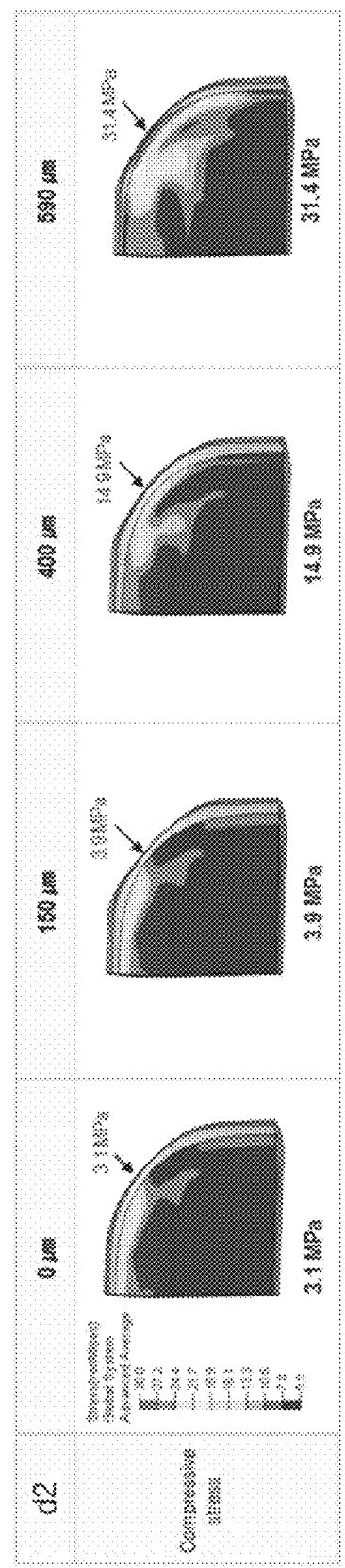
FIG. 8 is a measured value of a compressive stress applied to a second curved portion based on a bent length of FIG. 7.

FIG. 8 illustrates an example of a measured value of compressive stress applied to the second curved portion based on the bent length of FIG. 7.

Particularly, FIG. 8 illustrates an example of a measurement of the compressive stress applied to the second curved portion when the bent length d2 is in a range of 0 μm to 590 μm. A thickness of the display panel 200 used for the measurement is 200 μm or greater, and a length from the flat portion FT1 to the distal end CU_END of the curved portion is 1 mm or greater. The same display panel 200 is used under all conditions for the measurement Referring to FIG. 8, as the bent length d1 increases, the compressive stress applied to the second curved portion CU_C1 increases. When the bent length d2 is 590 μm, a wrinkle defect occurs on the display panel 200

According to an embodiment of the present disclosure, when, considering a material and a process tolerance of the display panel 200, the bent length d2 of the second curved portion CU_C1 is set to a value smaller than 590 μm, the wrinkle defect does not occur. This critical value can vary based on the material, a thickness, and the process tolerance of the display panel 200. Thus, the bent length d2 can range from 150 μm to 590 μm. Change of a size and a thickness of the adhesive layer, or an application of a concave shape of the second curved portion to be described later can allow the bent length d2 to be set to a larger range.

Hereinafter, an embodiment of the present disclosure that can remove a wrinkle defect in the second curved portion CU_C1 of the display panel 200 at the bent length d2 will be described.

To apply the curved portion to all of sides and corners of the display panel 200, the front member 400 having the first curved portion CU_S2 having a side bent by a certain bent length and the second curved portion CU_C2 having the corner bent by a certain bent length is prepared. Further, when the adhesive layer 300 is formed on an entire surface of the flat display panel 200 and then is attached to the front member 400 having the curved portion at a constant pressure, the same curved portion as that of the front member 400 can be applied to the display panel 200.

Figure 9:
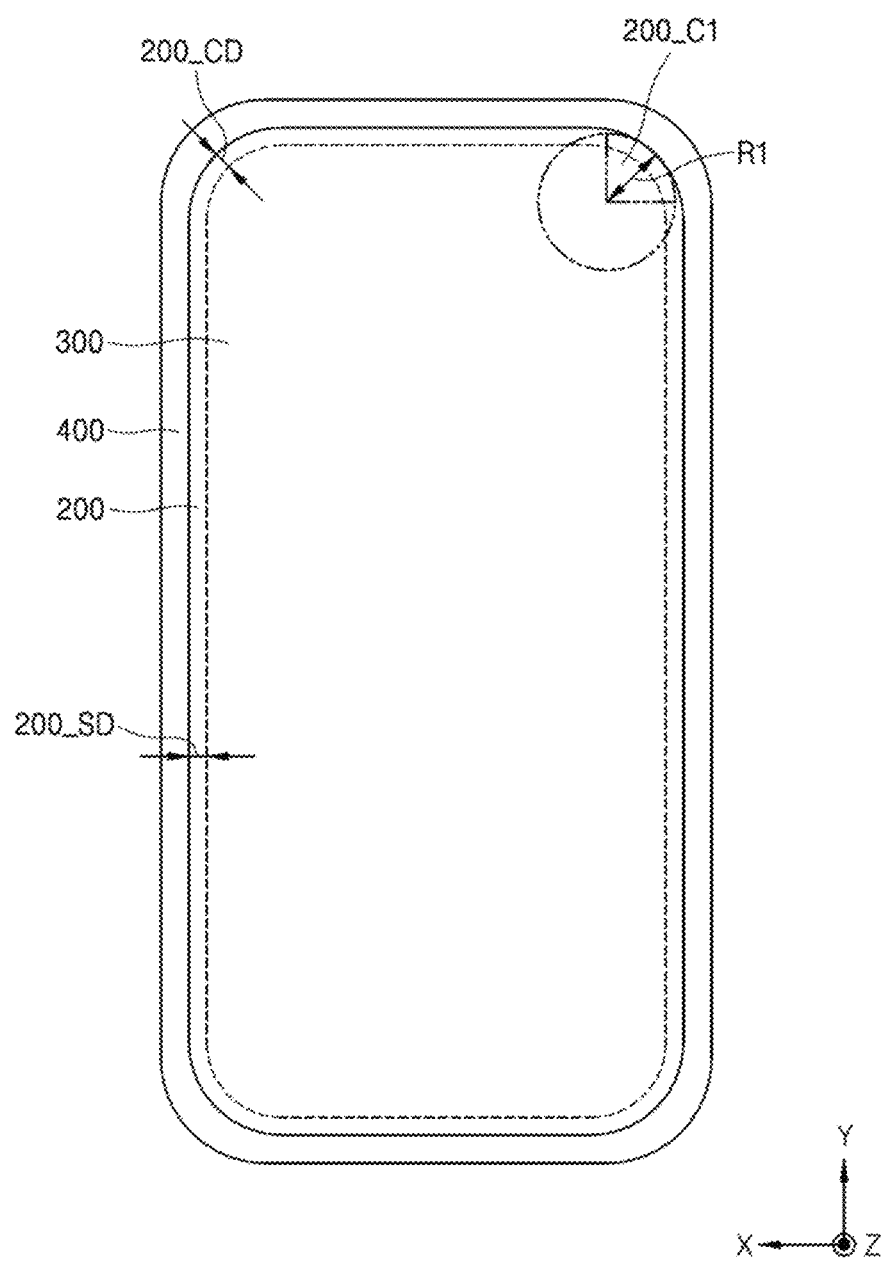
FIG. 9 is a plan view of a display device according to an embodiment of the present disclosure.

FIG. 9 is a plan view of a display device according to an embodiment of the present disclosure.

Particularly, FIG. 9 illustrates an arrangement structure of the display panel, the adhesive layer, and the front member to remove the wrinkle defect. Referring to FIG. 9, the adhesive layer 300 according to an embodiment of the present disclosure can have a size smaller than that of each of the display panel 200 and the front member 400.

A first exposed portion 200_SD on which the adhesive layer 300 is not disposed can be formed in a distal end area of the first curved portion of the display panel 200 so that the adhesive layer 300 has a size smaller than that of each of the display panel 200 and the front member 400. Further, a second exposed portion 200_CD in which the adhesive layer 300 is not disposed can be formed in a distal end area of the second curved portion. The first exposed portion 200_SD and the second exposed portion 200_CD can have the same width.

The adhesive layer 300 can attach the display panel 200 to the front member 400. For example, the adhesive layer 300 can include an optically transparent adhesive resin (OCR: Optically Clear Resin), or an optically transparent adhesive (OCA: Optically Clear Adhesive) capable of improving visibility while having excellent adhesion, or a pressure sensitive adhesive (PSA). However, embodiments of the present disclosure are not limited thereto.

When the adhesive layer 300 has a smaller size than that of the display panel 200, the distal end area of the display panel 200 is not attached to the front member 400, so the bent length of the front member 400 and the bent length of the display panel 200 can be different from each other.

For example, when the bent length of the front member 400 is smaller than the bent length of the display panel 200 due to a weight of the display panel 200, the display panel 200 can have a bent length due to the weight.

Further, when the bent length of the front member 400 is greater than the bent length of the display panel 200 due to the weight of the display panel 200, the display panel 200 can have a bent length that is greater than the bent length due to the weight thereof and is smaller than the bent length of the front member 400.

As a result, when an attachment deviation between the display panel 200 and the front member 400 and a deviation in the curved portion of the front member 400 occurs, a wrinkle defect due to the change of the bent length according to the change in the curved portion of the display panel 200 can be reduced. Therefore, a smaller compressive stress than that when the adhesive layer 200 is formed on the entire surface of the display panel 200 can be applied to the second curved portion, so that the wrinkle defect in the second curved portion CU_C1 can be reduced.

When the bent length of the front member 400 is larger than the bent length of the display panel 200, the reduction of the non-display area NA is smaller. However, when the bent length of the front member 400 is larger, the user can recognize that the non-display area NA decreases.

Further, since the bent lengths of a first curved portion CU_S2 and a second curved portion CU_C2 of the front member corresponding to the first curved portion CU_S1 and the second curved portion CU_C1 of the display panel 200 are equal to each other, grip feeling of the display device 100 by the user can be improved.

In FIG. 9, widths of the first exposed portion 200_SD and the second exposed portion 200_CD are equal to each other. A bent length d1 of the first curved portion CU_S1 and a bent length d2 of the second curved portion CU_C1 are equal to each other. Thus, a curved portion having an overall uniform curvature is realized. For example, an area of the second curved portion CU_C1 in an entire area of the display panel 200 is smaller than that of the first curved portion CU_S1. Thus, when the bent length d2 of the second curved portion CU_C1 is smaller than that of the example in FIG. 9 and the bent length d1 of the first curved portion CU_S1 is larger than that of the example in FIG. 9, the non-display area NA recognized by the user can be further reduced.

Hereinafter, an embodiment of the present disclosure in which the bent length d1 of the first curved portion CU_S1 is larger than the bent length d2 of the second curved portion CU_C1 to reduce the non-display area NA recognized by the user will be described.

Figure 10:
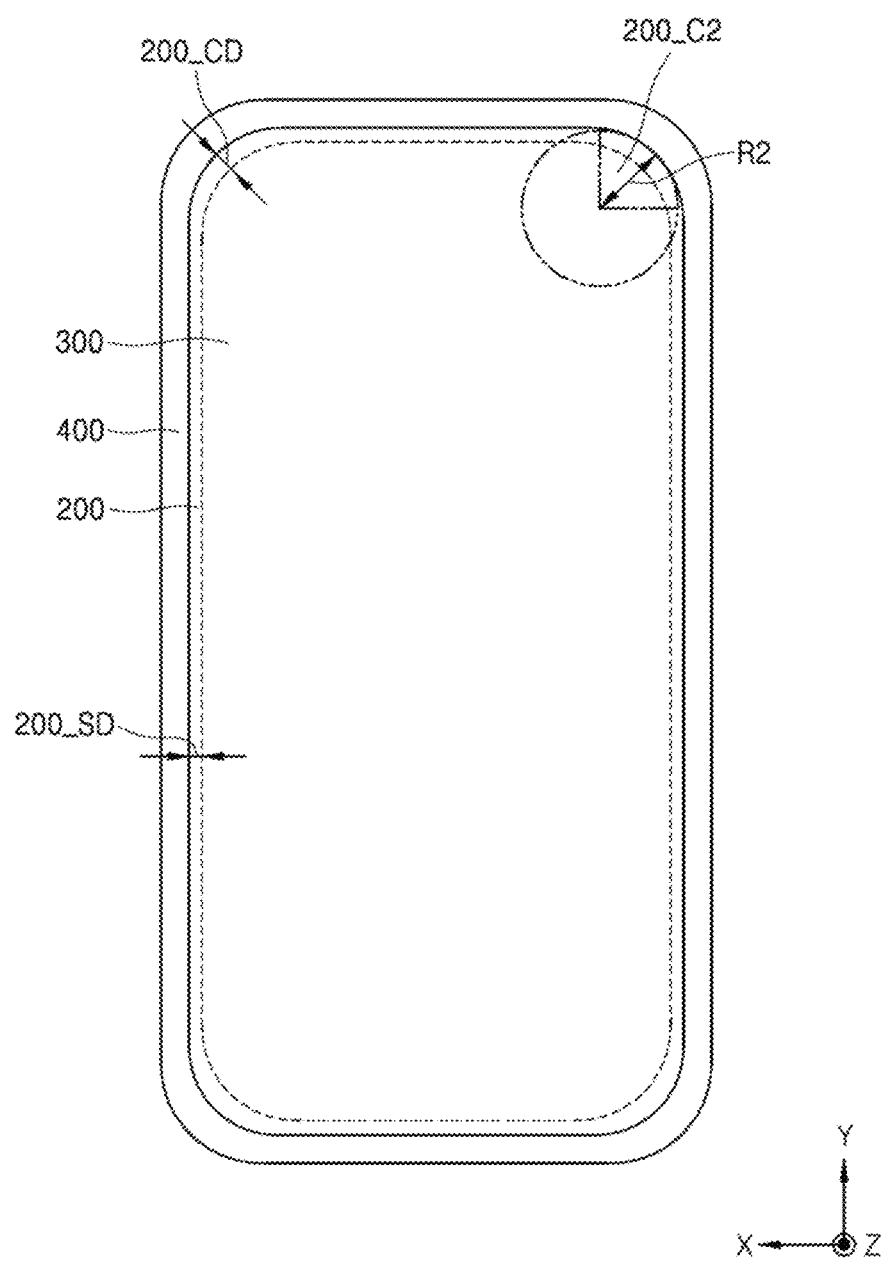
FIG. 10 is a plan view of a display device according to another embodiment of the present disclosure.

FIG. 10 is a plan view of a display device according to another embodiment of the present disclosure.

Particularly, FIG. 10 is a view showing an arrangement structure of the display panel, the adhesive layer, and the front member to remove the wrinkle defect.

Referring to FIG. 10, the adhesive layer 300 according to an embodiment of the present disclosure can have a size smaller than that of each of the display panel 200 and the front member 400.

Further, the second exposed portion 200_CD can be formed to have a larger width than that of the first exposed portion 200_SD.

When a width of the second exposed portion 200_CD is larger than that of the first exposed portion 200_SD, the bent length of the second curved portion CU_C1 and the first curved portion CU_S1 can be different from each other.

For example, the bent length d1 of the first curved portion CU_S1 can be set to 400 µm or greater, and the bent length d2 of the second curved portion CU_C1 can be set to 400 µm or smaller.

Adjusting the bent length d1 of the first curved portion CU_S1 formed on each of the top portion (or upper portion), bottom portion (or lower portion), left portion, and right portion of the display panel 200 to a maximum size of 400 µm or greater can allow the width of the non-display area NA recognized by the user in front of the display panel (Z-axis) to be minimized.

Further, the bent length d2 of the second curved portion CU_C1 can be adjusted to a value smaller than or equal to 400 µm in consideration of the wrinkle at the corner 200_C2. A size of the corner 200_C2 can vary based on the bent length d1 of the first curved portion CU_S1. As the bent length d1 of the first curved portion CU_S1 increases, the size of the corner 200_C2 can increase. For example, the larger the bent length d1 of the first curved portion CU_S1 is, the greater a difference thereof from the bent length d2 of the second curved portion CU_C1. Further, a middle area in which a bent length gradually decreases from the bent length d1 of the first curved portion CU_S1 to the bent length d2 of the second curved portion CU_C1 in the corner 200_C2 is required to be larger. Thus, the size of the corner 200_C2 can be increased.

A curvature radius R2 at a front portion of the corner in FIG. 10 can be larger than a curvature radius R1 at a front portion of the corner in FIG. 9. The curvature radius at a front portion of a corner in each of FIGS. 9 and 10 can be a curvature radius as measured at a front portion (Z-axis direction) of each of the corners 200_C1 and 200_C2.

As the size of the corner 200_C2 increases, the width of the non-display area NA recognized by the user in front of the display panel (Z-axis) can increase. Thus, components such as a camera, a proximity sensor, and a microphone can be disposed in an area where the width of the non-display area NA increases.

Figure 11:
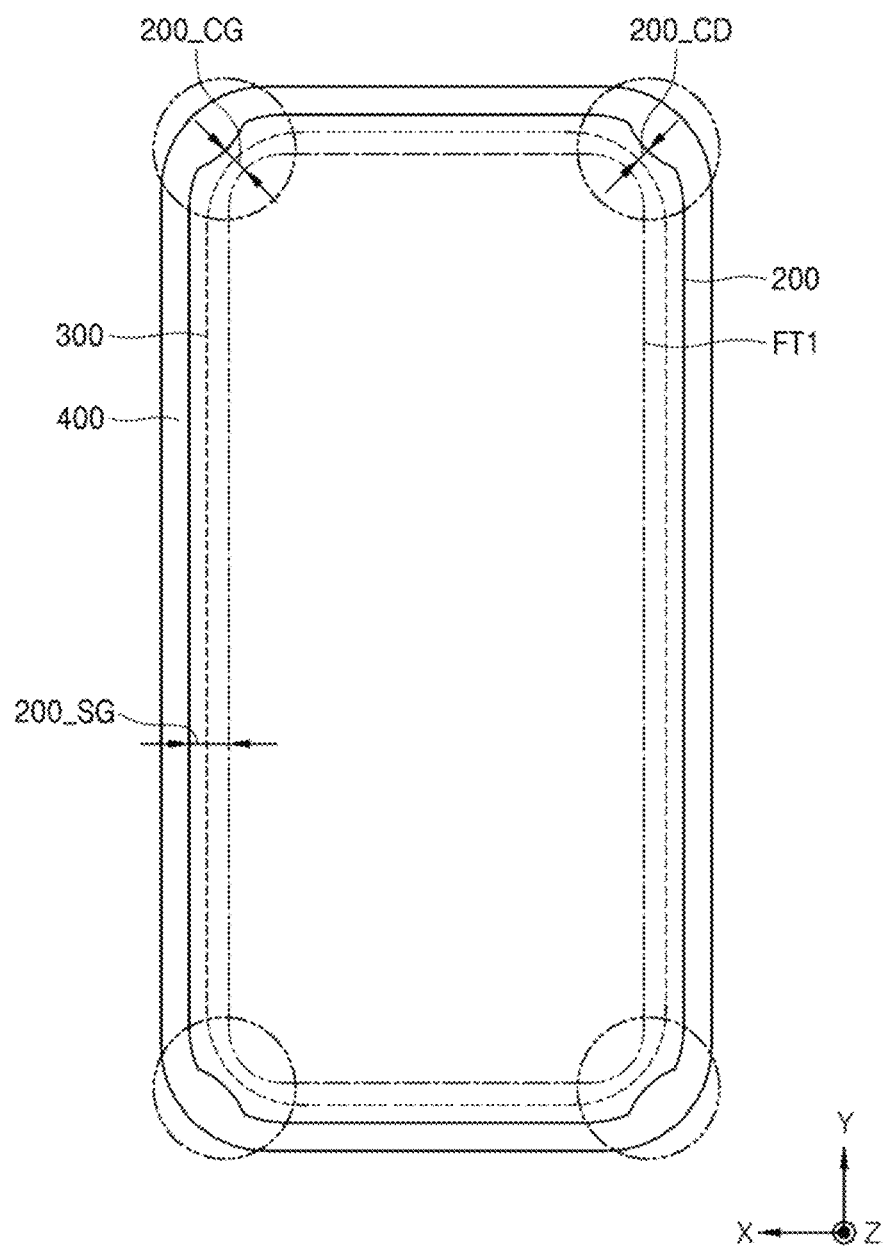
FIG. 11 is a plan view of a display device according to another embodiment of the present disclosure.

FIG. 11 is a plan view according to another embodiment of the present disclosure.

Particularly, FIG. 11 illustrates a structure of the display panel, the adhesive layer, and the front member that can reduce the non-display area. Referring to FIG. 11, the adhesive layer 300 according to an embodiment of the present disclosure has a size smaller than that of each of the display panel 200 and the front member 400. The second curved portion CU_C1 of the display panel 200 can include a concave shape in which a width increases as it goes from a point 200_CD having the shortest length of the second curved portion to a point connected to the first curved portion CU_S1. The concave shape can be formed by concavely cutting away a distal end of the second curved portion CU_C1.

The shortest length 200_CG from a distal end of the second curved portion CU_C1 having the concave shape to the flat portion FT1 can have a length of 1 mm or greater. The shortest length 200_CG can be defined as a length extending from a corner of the flat portion FT1 in a diagonal direction with respect to a direction parallel or perpendicular to a side of the display panel.

The shortest length 200_SG from the distal end of the first curved portion CU_S1 to the flat portion FT1 can have a length longer than the shortest length 200_CG from the distal end of the second curved portion CU_C1 to the flat portion FT1.

When the concave shape is formed at the second curved portion CU_C1, the wrinkle defect concentrated on the distal end of the second curved portion CU_C1 of the display panel 200 can be reduced. Thus, even when the bent length d1 of the first curved portion CU_S1 increases, the area of the second curved portion CU_C1 may not increase.

Figure 12:
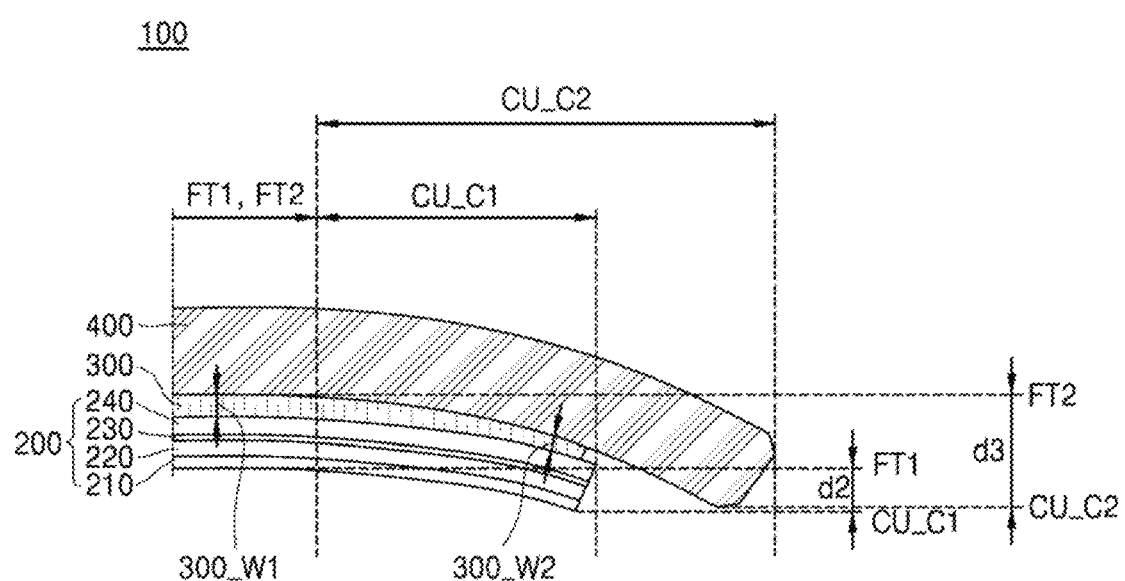
FIG. 12 is a cross-sectional view taken along a line C-C' in FIG. 4.

FIG. 12 is a cross-sectional view taken along a line C-C' in FIG. 4.

Referring to FIG. 12, the display device 100 can include the display panel 200, the adhesive layer 300, and the front member 400. Since the adhesive layer 300 attaches the display panel 200 to the front member 400, the adhesive layer 300 can have different thickness in areas thereof to adjust the bent length d2 of the second curved portion CU_C1.

For example, the thickness 300_W1 of the adhesive layer 300 is constant in an area corresponding to the flat portion FT1. The thickness 300_W2 of the adhesive layer can become smaller as it goes toward the distal end of the second curved portion CU_C1 in an area corresponding to the second curved portion CU_C1. When the thickness 300_W2 of the adhesive layer becomes smaller as it goes toward the distal end, the bent length d2 of the second curved portion CU_C1 of the display panel 200 can be smaller than a bent length d3 of the second curved portion CU_C2 of the front member, such that the wrinkle defect in the second curved portion CU_C1 can be reduced.

For example, the thickness 300_W1 of the adhesive layer 300 in an area corresponding to the flat portion FT1 can range from 100 μm to 300 μm, and the thickness 300_W2 of the adhesive layer 300 at the distal end of the second curved portion CU_C1 can range from 20 μm to 100 μm.

As the thickness 300_W1 of the adhesive layer 300 is larger, the impact applied to the display device 100 can be alleviated, and the bent length of the display panel 200 can be adjusted to a larger width.

Therefore, considering the bent length d3 of the display panel 200 and the increase in the thickness of the display device 100, the thickness 300_W1 of the adhesive layer 300 in the flat portion FT1 can be set to the range of 100 μm to 300 μm. Further, the thickness 300_W2 of the adhesive layer 300 at the distal end of the second curved portion CU_C1 can range from 20 μm to 100 μm, which is smaller than the thickness 300_W1 of the adhesive layer 300 in an area corresponding to the flat portion FT1. As a result, the thickness 300_W1 of the adhesive layer 300 can be larger, and the display device has good aesthetic.

When the adhesive layer 300 has different thicknesses in the areas of the display panel 100, the bent length of the display panel 200 can be equal to a length from the flat portion FT1 to the distal end of the second curved portion CU_C1, and the bent length of the front member 400 can be equal to a length from a flat portion FT2 thereof to the distal end of the second curved portion CU_C2.

When the bent length d2 of the display panel 200 is smaller than the bent length d3 of the front member 400, an actually-reduced width of the non-display area NA is not large. However, since the bent length d3 of the front member 400 is large, the user can recognize that the width of the non-display area NA is decreased.

Further, since the bent lengths of the first curved portion CU_S2 and the second curved portion CU_C2 of the front member corresponding to the first curved portion CU_S1 and the second curved portion CU_C1 of the display panel 200 are equal to each other, the grip feeling of the display device 100 by the user can be improved.

Figure 13:
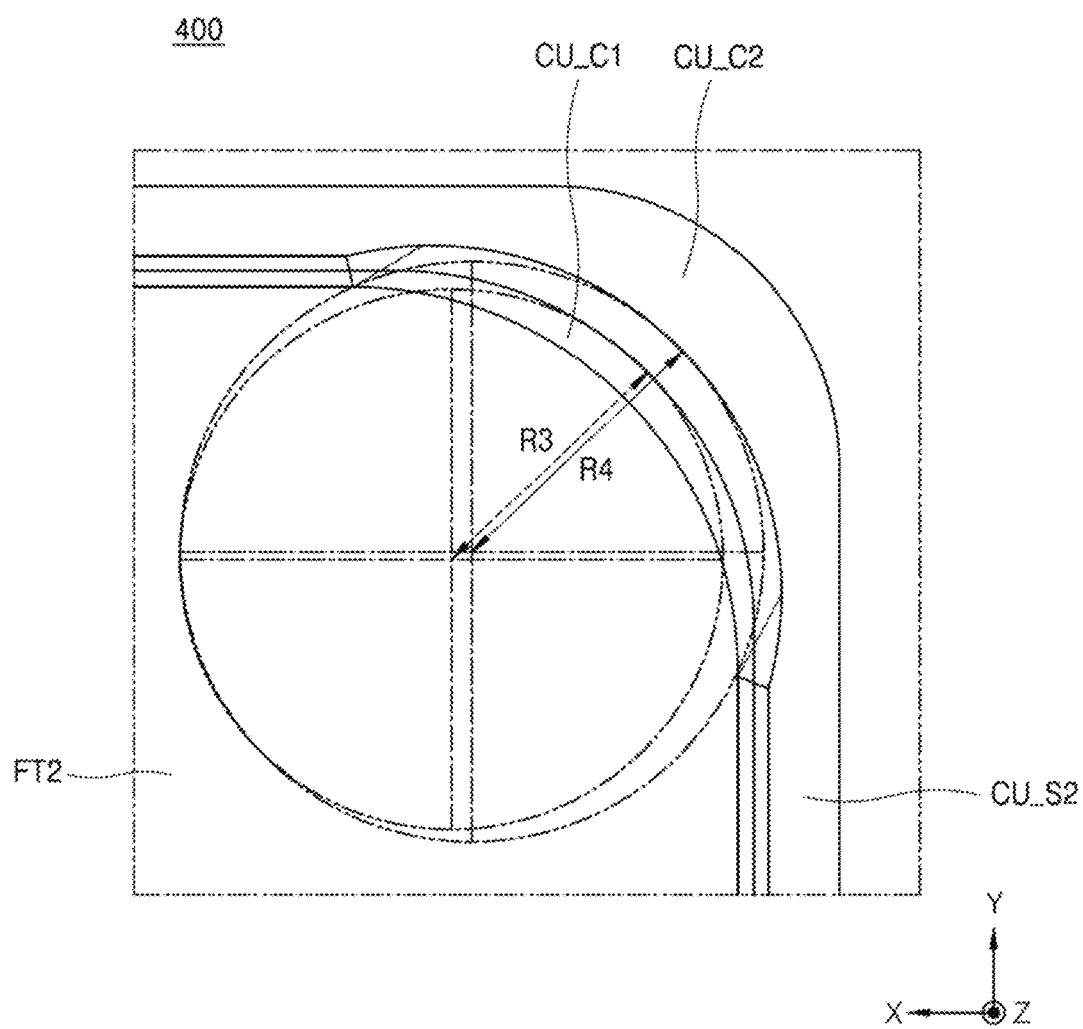
FIG. 13 is a plan view of a display device according to an embodiment of the present disclosure.

FIG. 13 is a plan view of a corner of a display device having a curved portion according to an embodiment of the present disclosure. FIG. 13 illustrates a structure of a front member to reduce a defect in a display device having a curved portion.

Referring to FIG. 13, the front member 400 of the display device 100 can include a flat portion FT2, a first curved portion CU_S2, and a second curved portion CU_C2 corresponding to the flat portion FT1, the first curved portion CU_S1 and the second curved portion CU_C1 of the display panel 200. A curvature radius R4 at a front portion of the second curved portion CU_C2 of the front member 400 as measured in the front direction (Z-axis direction) is larger than the curvature radius R3 at a front portion of the second curved portion CU_C1 of the display panel 200 as measured in the front direction (Z-axis direction), thereby reducing the defect in the display device.

As the radius of the curvature R4 at the front portion of the second curved portion CU_C2 of the front member is larger, the defect which can occur in a process of attaching the display panel 200 to the front member can be reduced.

Therefore, when the curvature radius R3 at the front portion of the second curved portion CU_C1 of the display panel 200 has a range between 6R and 8R, the curvature radius R4 at the front portion of the second curved portion CU_C2 of the front member has a range from 7R to 9R which is larger by 1R than the curvature radius R3 at the front portion of the second curved portion CU_C1 of the display panel 200. Thus, the defect and the abnormal outer appearance can be reduced. As a result, the corner of the display panel 200 protrudes due to the increase of the curvature radius R4 at the front portion of the second curved portion CU_C2 of the front member, thereby reducing the outer appearance abnormality. R is the radius of curvature, which means the radius of the circle closest to the curve at a point on the curve. That is, 6R, 8R, 7R, and 9R may mean that the radius of the circle closest to the curve at a point on the curve is 6 mm, 8 mm, 7 mm, or 9 mm.

A display device according to one or more embodiments of the present disclosure can be described as follows.

A display device according to one aspect of the present disclosure includes a display panel including a flat portion and a plurality of curved portions extending from the flat portion in a bent manner; a front member disposed on the display panel; and an adhesive layer disposed between the display panel and the front member. And the plurality of curved portions include a first curved portion formed at and along at least one of four sides of the display panel; and a second curved portion formed at one or more of corners between the four sides of the display panel, and the adhesive layer has a size smaller than a size of each of the display panel and the front member.

In some embodiments of the present disclosure, the first curved portion and the second curved portion are connected to each other and are integral with each other.

In some embodiments of the present disclosure, the first curved portion includes a first exposed portion on which the adhesive layer is not disposed, and the second curved portion includes a second exposed portion on which the adhesive layer is not disposed, wherein the first exposed portion has a size smaller than a size of the second exposed portion.

In some embodiments of the present disclosure, a thickness of the adhesive layer is uniform across an area thereof corresponding to the flat portion, and a thickness of the adhesive layer varies across an area thereof corresponding to the second curved portion, and decreases as the adhesive layer extends toward a distal end of the second curved portion.

In some embodiments of the present disclosure, the thickness of the adhesive layer in the area thereof corresponding to the flat portion is in a range of 100 μm to 300 μm, and the thickness of the adhesive layer in an area thereof corresponding to the distal end of the second curved portion is in a range of 20 μm to 100 μm.

In some embodiments of the present disclosure, a shortest length from a distal end of the first curved portion to the flat portion is larger than a shortest length from a distal end of the second curved portion to the flat portion.

In some embodiments of the present disclosure, the shortest length from the distal end of the second curved portion to the flat portion is defined as a length extending from a corner of the flat portion in a diagonal direction relative to a direction parallel or perpendicular to a side of the display panel.

In some embodiments of the present disclosure, the second curved portion has a concave shape in which a width of the second curved portion increases as the second curved portion extends from a point having the shortest length of the second curved portion to a point connected to the first curved portion. In other words, the second curved portion has a concave shape that increases in width from a portion having the shortest length of the second curved portion toward a portion connected to the first curved portion.

In some embodiments of the present disclosure, a front portion of the first curved portion has a linear shape, and a side portion of the first curved portion has a round shape, and each of front and side portions of the second curved portion has a round shape.

In some embodiments of the present disclosure, the front member includes a flat portion, a first curved portion, and a second curved portion respectively corresponding to the flat portion, the first curved portion, and the second curved portion of the display panel, and a curvature radius at a front portion of the second curved portion of the front member is greater than a curvature radius t a front portion of the second curved portion of the display panel.

A display device according to another aspect of the present disclosure includes a display panel including a flat portion and a plurality of curved portions extending from the flat portion in a bent manner; a front member disposed on the display panel; and an adhesive layer disposed between the display panel and the front member, and the plurality of curved portions include a first curved portion formed at and along at least one of four sides of the display panel; and a second curved portion formed at one or more of corners between the four sides of the display panel, and a side portion of the first curved portion and a side portion of the second curved portion are connected to each other and is integral to each other, and the second curved portion has a concave shape in which a width of the second curved portion increases as the second curved portion extends from a point having a shortest length of the second curved portion to a point connected to the first curved portion. In other words, the second curved portion has a concave shape that increases in width from a portion having the shortest length of the second curved portion toward a portion connected to the first curved portion.

A display device according to another aspect of the present disclosure includes a display panel including a flat portion and a plurality of curved portions extending from the flat portion in a bent manner; a front member disposed on the display panel; and an adhesive layer disposed between the display panel and the front member. And the plurality of curved portions include: a first curved portion formed at and along at least one of four sides of the display panel; and a second curved portion formed at one or more of corners between the four sides of the display panel. And, a bent length of the first curved portion is larger than a bent length of the second curved portion, and the bent length of the first curved portion is a length from a lower portion of the flat portion to a lower portion of a distal end of the first curved portion, and the bent length of the second curved portion is a length from the lower portion of the flat portion to a lower portion of a distal end of the second curved portion.

Although the embodiments of the present disclosure have been described in more detail with reference to the accompanying drawings, the present disclosure is not necessarily limited to these embodiments. The present disclosure can be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A display device, comprising:
a display panel including a flat portion and a plurality of curved portions extending from the flat portion in a bent manner;
a front member disposed on the display panel; and
an adhesive layer disposed between the display panel and the front member,
wherein the plurality of curved portions include:
a first curved portion disposed at and along at least one of sides of the display panel; and
a second curved portion disposed at one or more of corners between the sides of the display panel, and
wherein the adhesive layer has a size smaller than a size of each of the display panel and the front member,
wherein the first curved portion includes a first exposed side portion on which the adhesive layer is not disposed,
wherein the second curved portion includes a second exposed rounded corner portion on which the adhesive layer is not disposed, and
wherein a first distance between an outer edge of the first exposed side portion of the display panel and a first outer edge of the adhesive layer is less than a second distance between an outer edge of the second exposed rounded corner portion of the display panel and a second outer edge of the adhesive layer.

2. The display device of claim 1, wherein the first curved portion and the second curved portion are connected to each other and are integral with each other.

3. The display device of claim 1, wherein a thickness of the adhesive layer is same across a portion thereof corresponding to the flat portion, and
wherein a thickness of the adhesive layer varies across a portion thereof corresponding to the second curved portion, and decreases as the adhesive layer extends toward a distal end of the second curved portion.

4. The display device of claim 3, wherein the thickness of the adhesive layer in the portion thereof corresponding to the flat portion is in a range of approximately 100 μm to 300 μm, and
wherein the thickness of the adhesive layer in a portion thereof corresponding to the distal end of the second curved portion is in a range of approximately 20 μm to 100 μm.

5. The display device of claim 1, wherein a shortest length from a distal end of the first curved portion to the flat portion is larger than a shortest length from a distal end of the second curved portion to the flat portion.

6. The display device of claim 5, wherein the shortest length from the distal end of the second curved portion to the flat portion is a length of a diagonal direction relative to a direction parallel or perpendicular to a side of the display panel at a corner of the flat portion.

7. The display device of claim 5, wherein the second curved portion has a concave shape that increases in width from a portion having the shortest length of the second curved portion toward a portion connected to the first curved portion.

8. The display device of claim 1, wherein a front portion of the first curved portion has a linear shape, and a side portion of the first curved portion has a round shape, and
wherein each of front and side portions of the second curved portion has a round shape.

9. The display device of claim 1, wherein the front member includes a flat portion, a first curved portion, and a second curved portion respectively corresponding to the flat portion, the first curved portion, and the second curved portion of the display panel, and
wherein a curvature radius at a front portion of the second curved portion of the front member is greater than a curvature radius on a front portion of the second curved portion of the display panel.

10. The display device of claim 1, wherein the display panel has four sides.

11. A display device, comprising:
a display panel including a flat portion and a plurality of curved portions extending from the flat portion in a bent manner;
a front member disposed on the display panel; and
an adhesive layer disposed between the display panel and the front member,
wherein the plurality of curved portions include:
a first curved portion disposed at and along at least one of four sides of the display panel; and
a second curved portion disposed at one or more of corners between the four sides of the display panel,
wherein a side portion of the first curved portion and a side portion of the second curved portion are connected to each other and are integral to each other,
wherein the second curved portion has a concave shape in which a width of the second curved portion increases as the second curved portion extends from a point having a shortest length of the second curved portion to a point connected to the first curved portion,
wherein the first curved portion includes a first exposed side portion on which the adhesive layer is not disposed,
wherein the second curved portion includes a second exposed rounded corner portion on which the adhesive layer is not disposed, and
wherein a first distance between an outer edge of the first exposed side portion of the display panel and a first outer edge of the adhesive layer is less than a second distance between an outer edge of the second exposed rounded corner portion of the display panel and a second outer edge of the adhesive layer.

12. A display device, comprising:
a display panel including a flat portion and a plurality of curved portions extending from the flat portion in a bent manner;
a front member disposed on the display panel; and
an adhesive layer disposed between the display panel and the front member,
wherein the plurality of curved portions include:
a first curved portion formed at and along at least one of four sides of the display panel; and
a second curved portion formed at one or more of corners between the four sides of the display panel,
wherein a bent length of the first curved portion is larger than a bent length of the second curved portion, wherein the bent length of the first curved portion is a length from a lower portion of the flat portion to a lower portion of a distal end of the first curved portion, and the bent length of the second curved portion is a length from the lower portion of the flat portion to a lower portion of a distal end of the second curved portion,
wherein the first curved portion includes a first exposed side portion on which the adhesive layer is not disposed, wherein the second curved portion includes a second exposed rounded corner portion on which the adhesive layer is not disposed, and wherein a first distance between an outer edge of the first exposed side portion of the display panel and a first outer edge of the adhesive layer is less than a second distance between an outer edge of the second exposed rounded corner portion of the display panel and a second outer edge of the adhesive layer.

13. The display device of claim 1, wherein a width of the first exposed side portion is smaller than a width of the second exposed rounded corner portion.

14. The display device of claim 13, wherein a bent length of the first curved portion is greater than a bent length of the second curved portion.

15. The display device of claim 11, wherein a width of the first exposed side portion is smaller than the width of the second exposed rounded corner portion.

16. The display device of claim 15, wherein a bent length of the first curved portion is greater than a bent length of the second curved portion.

17. The display device of claim 12, wherein a width of the first exposed side portion is smaller than the width of the second exposed rounded corner portion.

18. The display device of claim 1, wherein an outer edge of the front member and the outer edge of the second exposed rounded corner portion of the display panel both extend pass the second outer edge of the adhesive layer and are not overlapped by the adhesive layer.

* * * * *